US007590418B1

(12) United States Patent
Thomson

(10) Patent No.: US 7,590,418 B1
(45) Date of Patent: Sep. 15, 2009

(54) METHOD AND APPARATUS OF A LOCATION SERVER FOR HIERARCHICAL WLAN SYSTEMS

(75) Inventor: Allan Thomson, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 462 days.

(21) Appl. No.: 11/336,050

(22) Filed: Jan. 20, 2006

(51) Int. Cl.
*H04W 4/00* (2006.01)
(52) U.S. Cl. .................. 455/433; 455/456.6; 455/115.3; 455/550.1; 455/446; 370/338; 370/328; 370/331
(58) Field of Classification Search .................. 370/338, 370/331, 328; 455/433, 456, 456.6, 115.3, 455/550.1, 445; 709/229; 342/464
See application file for complete search history.

(56) References Cited

U.S. PATENT DOCUMENTS

| 7,317,419 | B2* | 1/2008 | Sugar et al. .................. 342/464 |
| 2003/0145092 | A1* | 7/2003 | Funato et al. ............... 709/229 |
| 2005/0105496 | A1* | 5/2005 | Ambrosino .................. 370/338 |
| 2005/0185618 | A1 | 8/2005 | Friday et al. |
| 2005/0195109 | A1 | 9/2005 | Davi et al. |
| 2005/0208952 | A1 | 9/2005 | Deitrich et al. |
| 2005/0261004 | A1 | 11/2005 | Dietrich et al. |
| 2006/0109811 | A1* | 5/2006 | Schotten et al. ............. 370/328 |
| 2006/0217131 | A1* | 9/2006 | Alizadeh-Shabdiz et al. ....................... 455/456.1 |
| 2006/0251239 | A1* | 11/2006 | Taylor et al. ........... 379/355.04 |
| 2007/0076662 | A1* | 4/2007 | Jain et al. .................... 370/331 |
| 2007/0247366 | A1* | 10/2007 | Smith et al. ................. 342/464 |

FOREIGN PATENT DOCUMENTS

WO    WO 01/20926 A1    3/2001

\* cited by examiner

*Primary Examiner*—Charles N Appiah
*Assistant Examiner*—Michael T Vu
(74) *Attorney, Agent, or Firm*—Baker Botts L.L.P.

(57) ABSTRACT

Methods, apparatuses, and systems directed to processing location and network data in a wireless network. According to one implementation of the present invention, a location server functions both as a middleware data collection engine and a calculation engine in a hierarchical WLAN system. In one implementation, the location server collects network data associated with mobile nodes. As described in further detail below, mobile nodes may include one or more of wireless mobile stations (e.g., wireless laptops, dual-mode phones, personal digital assistants, etc.), radio frequency identification (RFID) tags, rogue wireless access points and rogue wireless clients. In one implementation, the location server may process at least some of the network data to determine information associated with the mobile nodes. For example, the location server may compute the location of a given mobile node, which is accessible to other applications using one or more defined application programming interfaces (APIs). In one implementation, the location server may track the node history of a given mobile node. In one implementation, the location server may correlate processed network information to one or more locations or regions in the wireless network environment. For example, in one implementation, the location server may compute the load (i.e., amount of traffic) in a given region. The load may be used to further compute traffic patterns in the region. Such computations may be based on types of mobile nodes (e.g., wireless clients) and/or based on time periods (e.g., 12 pm-5 pm). As described in more detail below, such information may facilitate management of a wireless network. For example, the processed information may indicate locations that may require deployment of more resources (e.g., additional wireless access points).

30 Claims, 8 Drawing Sheets

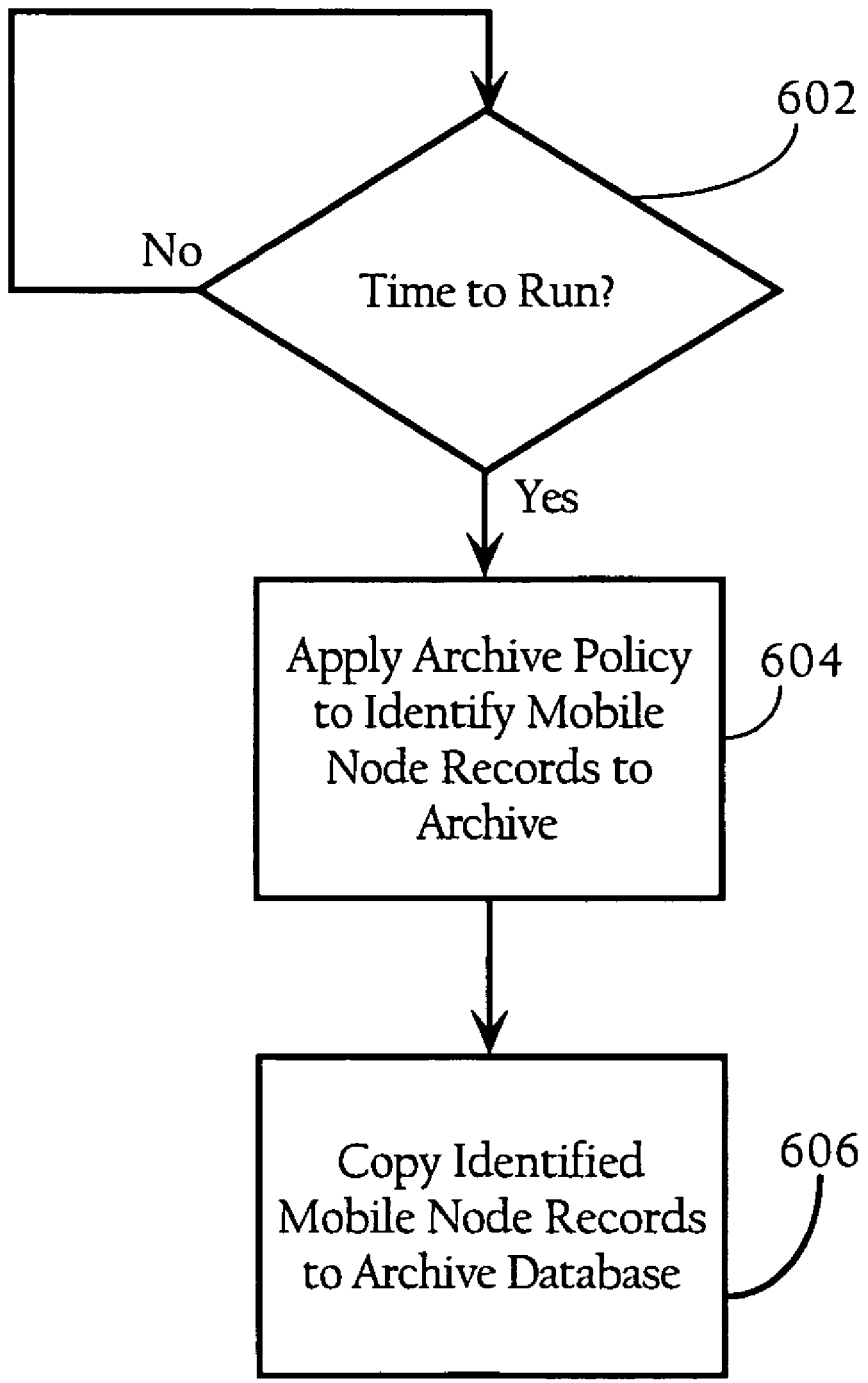
Fig._6

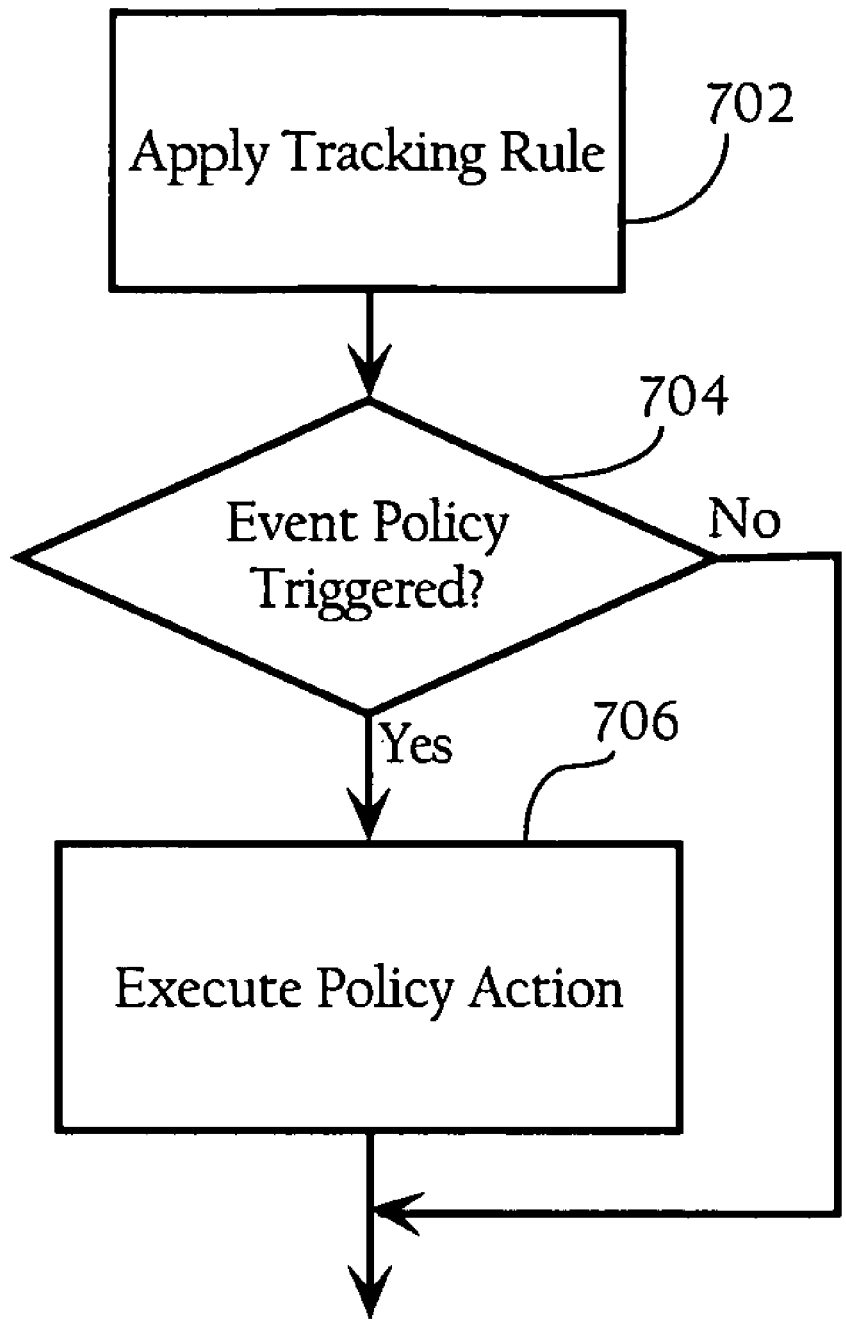
Fig._7

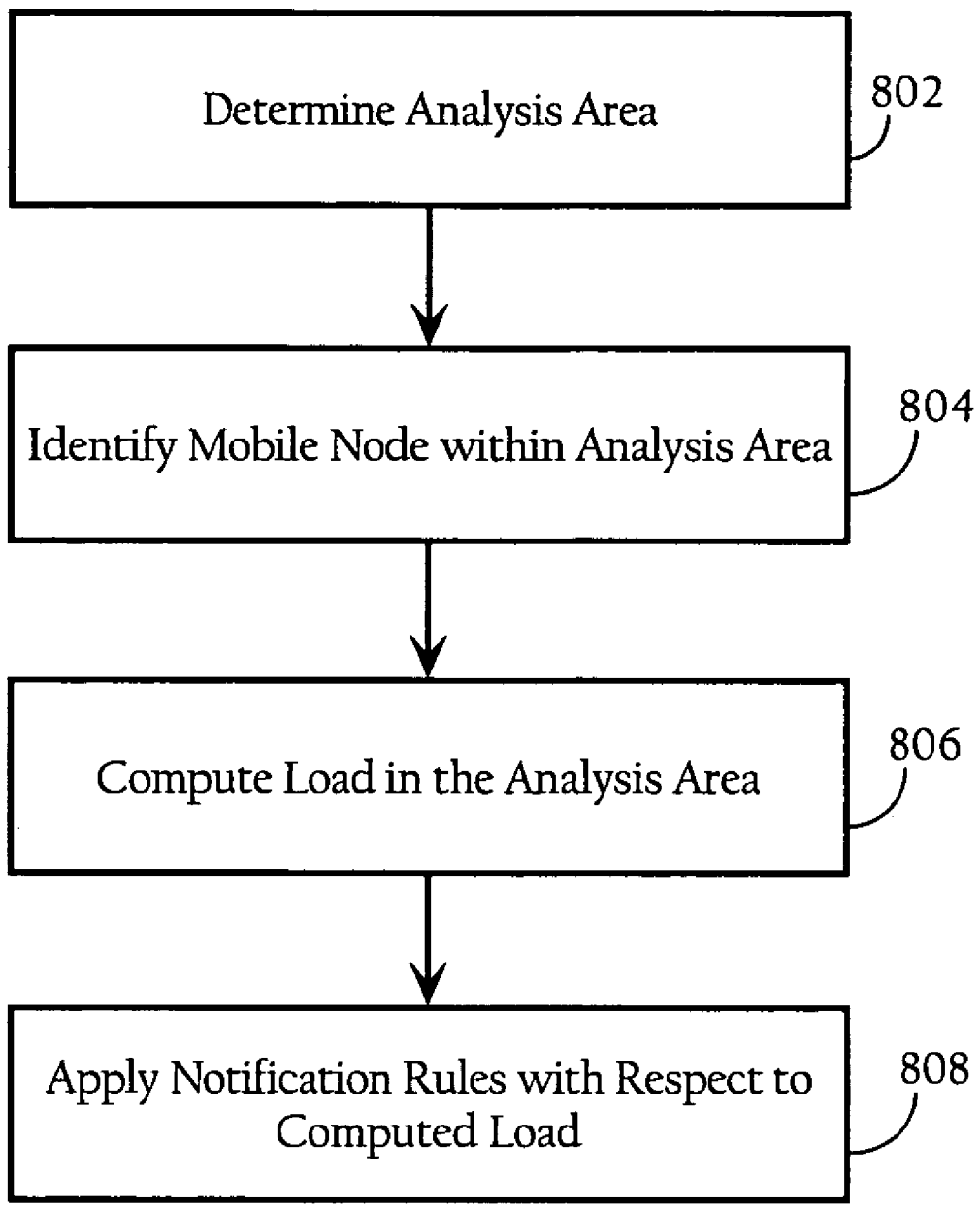
Fig._8 ns and productivity of their communications and applications, and in doing so, require greater visibility, security, management, and performance from their network.

METHOD AND APPARATUS OF A LOCATION SERVER FOR HIERARCHICAL WLAN SYSTEMS

CROSS-REFERENCE TO RELATED APPLICATIONS AND PATENTS

This application makes reference to the following commonly owned U.S. patent applications and/or patents, which are incorporated herein by reference in their entirety for all purposes:

U.S. patent application Ser. No. 10/407,584 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/783,186 in the name of Robert J. Friday and Paul F. Dietrich, entitled "Wireless Node Location Mechanism Using Antenna Pattern Diversity to Enhance Accuracy of Location Estimates;"

U.S. patent application Ser. No. 10/788,645 in the name of Robert J. Friday and Alexander Hills, entitled "Selective Termination of Wireless Connections to Refresh Signal Information in Wireless Node Location Infrastructure;"

U.S. patent application Ser. No. 10/802,366 in the name of Paul F. Dietrich, Gregg Scott Davi and Robert J. Friday, entitled "Location of Wireless Nodes Using Signal Strength Weighting Metric;"

U.S. patent application Ser. No. 10/848,276 in the name of Paul F. Dietrich, Gregg Scott Davi and Robert J. Friday, entitled "Wireless Node Location Mechanism Featuring Definition of Search Region to Optimize Location Computation;"

U.S. patent application Ser. No. 10/938,460 in the name of Paul F. Dietrich, and Gregg Scott Davi, entitled "Enhanced Wireless Node Location Using Differential Signal Strength Metric;" and U.S. patent application Ser. No. 11/195,536 in the name of Brian Cox, Bruce McMurdo and Anuradha Gade, entitled "Method and System for Dynamic Assignment of Wireless LAN Access Point Identity."

FIELD OF THE INVENTION

The present invention relates to wireless networks and, more particularly, to methods, apparatuses, and systems directed to wireless node location in wireless networks.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

Given the mobility provided by WLANs, there also exists a strong market desire to provide location-aware applications that can utilize a broad array of information that a given network infrastructure may collect on mobile nodes, such as mobile stations, rogues, RFID tags, and the like. Indeed, the mobility afforded by WLANs has generated great interest in applications and services that are a function of a mobile user's physical location. Examples of such applications include: printing a document on the nearest printer, locating a mobile user, displaying a map of the immediate surroundings, and guiding a user inside a building. In addition, identifying the location of wireless clients facilitates a variety of security and management tasks associated with wireless networks. For example, location tracking lets network administrators locate clients and assets in a timely manner, establish access control policies that are based on geographic location and identify the source and location of rogue access points, among other benefits. The required or desired granularity of location information varies from one application to another. Indeed, the accuracy required by an application that selects the nearest network printer, or locates a rogue access point, often requires the ability to determine in what room a mobile station is located. Accordingly, much effort has been dedicated to improving the accuracy of wireless node location mechanisms. Some of the U.S. applications identified above disclose wireless node location mechanisms integrated into WLAN infrastructures. In addition to location tracking information, some application may desire to use other information maintained by the wireless network infrastructure. Many location tracking systems, however, are based on separate or overlay networks, which may not cover an entire Wireless LAN. By not integrating location tracking capabilities into the WLAN infrastructure itself, it is often difficult to develop applications that examine data related to WLAN operation and therefore diagnose or detect problems at given locations in the wireless network infrastructure.

In light of the foregoing, a need in the art exists for methods, apparatuses, and systems directed to the integrated collection and processing of location and wireless network data. Embodiments of the present invention substantially fulfill this need.

DESCRIPTION OF THE DRAWINGS

FIG. 6 is a flow chart illustrating a process flow, according to one implementation of the present invention, associated with archiving historical data.

FIG. 7 is a flow chart illustrating a process flow, according to one implementation of the present invention, associated with application of event-based tracking policy.

FIG. 8 is a flow chart illustrating a process flow, according to one implementation of the present invention, associated with computing load in a given region.

DESCRIPTION OF PREFERRED EMBODIMENT(S)

A. Overview

The present invention provides methods, apparatuses, and systems directed to processing location and network data in a wireless network. According to one implementation of the present invention, a location server functions both as a middleware data collection engine and a calculation engine in a hierarchical WLAN system. In one implementation, the location server may be deployed on one or more hardware devices. In one implementation, the location server is deployed on multiple hardware devices simultaneously to appear as a virtual server. In one implementation, the location server collects network data associated with mobile nodes. As described in further detail below, mobile nodes may include one or more of wireless mobile stations (e.g., wireless laptops, dual-mode phones, personal digital assistants, etc.), radio frequency identification (RFID) tags, rogue wireless access points and rogue wireless clients. In one implementation, the location server may process at least some of the network data to determine information associated with the mobile nodes. For example, the location server may compute the location of a given mobile node, which is accessible to other applications using one or more defined application programming interfaces (APIs). In one implementation, the location server may track the node history of a given mobile node. In one implementation, the node history may include location history, node statistics, etc. In one implementation, the location server may correlate processed network information to one or more locations or regions in the wireless network environment. For example, in one implementation, the location server may compute the load (i.e., amount of traffic) in a given region. The load may be used to further compute traffic patterns in the region. Such computations may be based on types of mobile nodes (e.g., wireless clients) and/or based on time periods (e.g., 12 pm-5 pm). As described in more detail below, such information may facilitate management of a wireless network. For example, the processed information may indicate locations that may require deployment of more resources (e.g., additional wireless access points).

B. Exemplary Wireless Network System Architecture

B.1. Network Topology

Figure 1:
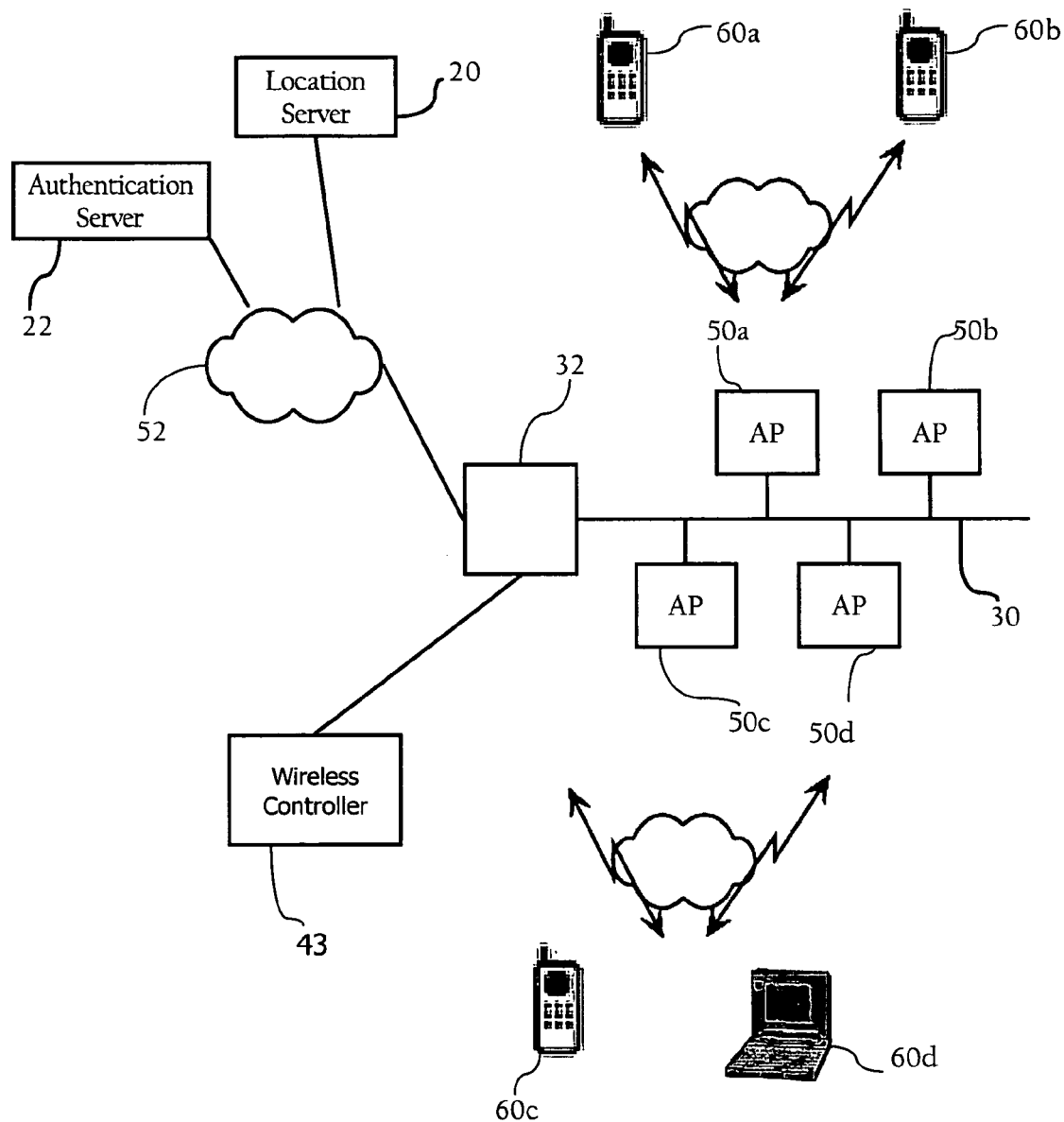
FIG. 1 is a topological diagram of the components in a wireless local area network (WLAN) system according to one implementation of the present invention.

A network environment including a wireless local area network (WLAN) according to one implementation of the present invention is shown in FIG. 1. In a specific embodiment of the present invention, the system includes a wireless location server, or location server 20, an Authentication Authorization and Account (AAA) server 22, a local area network (LAN) 30, a router 32, wireless controller 43, and wireless access points 50a, 50b, 50c, and 50d (collectively referred to as wireless access points 50). LAN 30 is implemented by a switch (or an array of switches) and/or other network devices, such as a bridge.

As FIG. 1 illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of data between location server 20 and wireless clients 60 via wireless access points 50. Of course, network 52 can include a variety of network segments, transmission technologies and components, such as terrestrial WAN links, satellite links, optical fiber links, and cellular links. LAN 30 may be a LAN or LAN segments implemented by an Ethernet switch (not shown) or an array of switches having multiple ports to which wireless access points 50 are connected. The wireless access points 50 are typically connected to the switch ports via Ethernet links; however, other link layer connection protocols or communication means can be employed. In addition, in some implementations, the wireless access points 50 may be directly connected to the wireless controller 43, as disclosed in U.S. Ser. No. 10/407,584, now U.S. Pat. No. 7,212,837. FIG. 1 illustrates one possible network environment in which the invention may operate; however, other implementations are possible. For example, although location server 20 is illustrated as being on a different LAN or LAN segment, it may be co-located with wireless access points 50.

The wireless access points 50 are operative, in connection with wireless controller 43, to wirelessly communicate with wireless client devices 60a, 60b, 60c, and 60d. In one implementation, the wireless controller 43 may be implemented as a wireless domain server (WDS) or, alternatively, as a wireless switch. If the central controller 70 is implemented with a WDS, the central controller 70 is operative to communicate with autonomous or so-called "fat" wireless access points. If the central controller 70 is implemented with a wireless switch, the central controller 70 is operative to communicate with light-weight wireless access points, as disclosed in U.S. patent application Ser. No. 10/407,584. In one implementation, the wireless access points 50 implement the wireless network protocol specified in the IEEE 802.11 WLAN specification. In addition, the network infrastructure may also include a Wireless LAN Solution Engine (WLSE) offered by Cisco Systems, Inc. of San Jose, Calif. or other wireless network management system. In some implementations, the network infrastructure may also include one or more Wireless Control System (WCS) nodes operative to manage one or more wireless switches and access points. Furthermore, U.S. patent application Ser. No. 11/195,536 discloses methods and systems for automatically assigning an identity to, and configuring, the wireless access points 50. Of course, configuration and management information can be obtained in a variety of manners without departing from the scope of the present invention. In some implementations, the elements of the WLAN system, such as wireless controllers 43 and wireless access points 50 support respective management information bases (MIBs) that allow location server 20 to collect data corresponding to mobile nodes using SNMP queries. Other network management or data collection protocols can be used.

Figure 2:
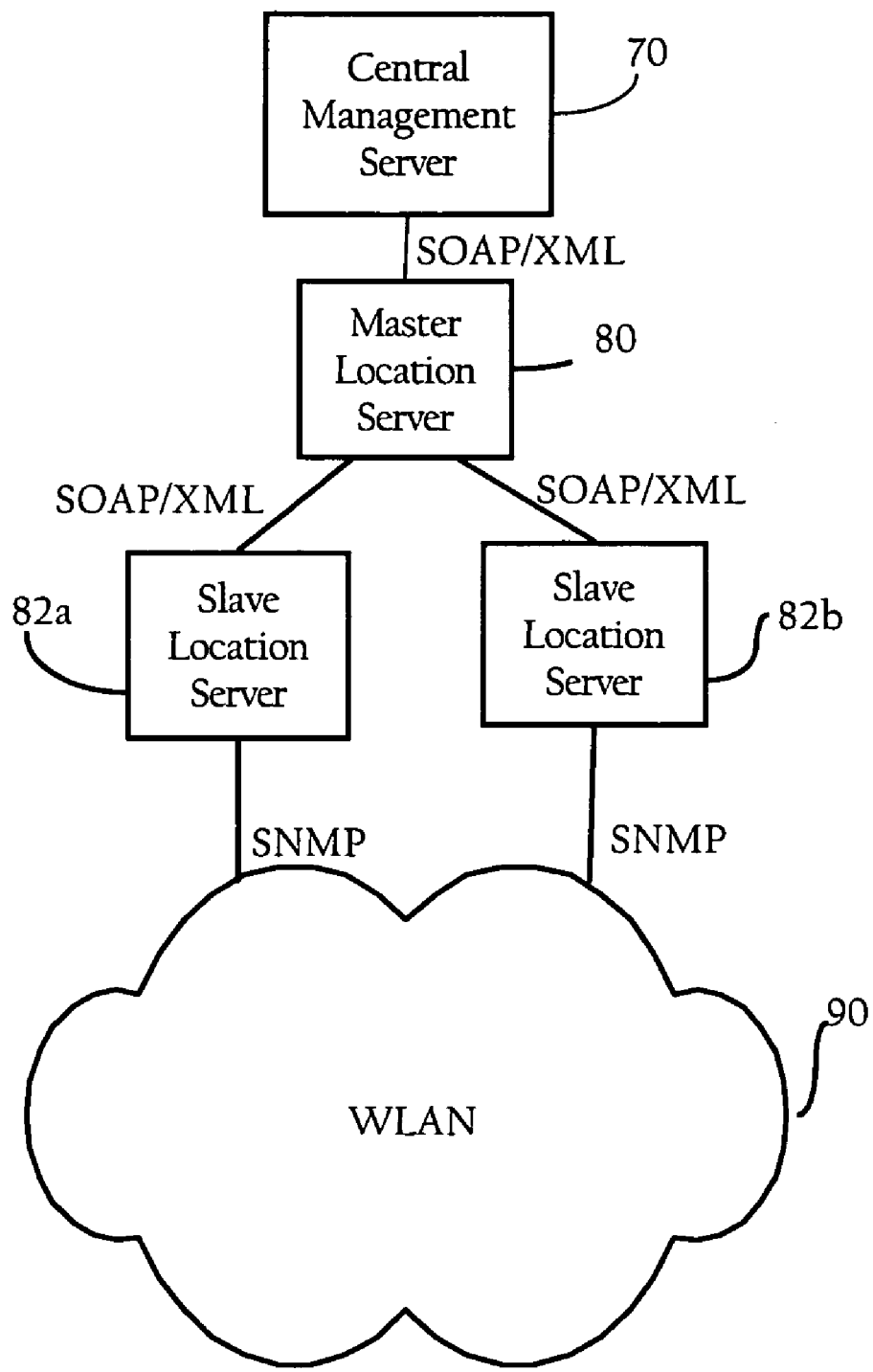
FIG. 2 is a topological diagram of the components in a wireless local area network (WLAN) system according to another implementation of the present invention.

While FIG. 1 illustrates one implementation in which a location server may be implemented as a single location server 20, in other implementations, a location server may be implemented as multiple servers (e.g., a master location server and one or more slave location servers), as described below, in larger network deployments. FIG. 2 is a topological diagram of the components in a wireless local area network (WLAN) system according to another implementation of the present invention. In one implementation, the WLAN system may include a central management server 70, master location server 80, and slave location servers 82a and 82b. Network cloud 90 represents a WLAN system including one or more wireless access points and other network devices, such as wireless controllers or switches. In the hierarchical configuration illustrated in FIG. 2, slave location servers 82a, 82b are operative to collect and process network and location data, while master location server 80 is operative to provide coordinate operation of the slave location servers 82a, 82b and provide the unitary interface through which location and network data is obtained. Of course, the division of tasks between master and slave location servers can be varied considerably without departing from the scope of the invention.

Location server 20, as discussed above, may employ any suitable protocols or interfaces (e.g., Simple Network Management Protocol (SNMP), etc.) for collecting data from one or more WLAN elements. Furthermore, location server may support one to a plurality of interfaces that allow access to collected and/or processed location and network data. For example, as FIG. 2 illustrates, the location servers may support the Simple Object Access Protocol (SOAP) and Extensible Markup Language (XML) protocols. In one implementation, the use of an object-oriented interface, such as a SOAP/XML interface, significantly accelerates application development and provides a higher-level interface to the functionality of location server 20. A SOAP/XML interface includes a set of object oriented methods that take objects as arguments and provide an object-based response. In one implementation, a SOAP/XML interface may provide full configuration and monitoring of location server 20, as well as provide collection and processing of data associated with the hierarchical WLAN system. This interface may alternatively be implemented using other protocols and technologies such as HyperText MarkUp Language (HTML), HyperText Transport Protocol (HTTP), etc.

B.2. Location Server

Figure 3:
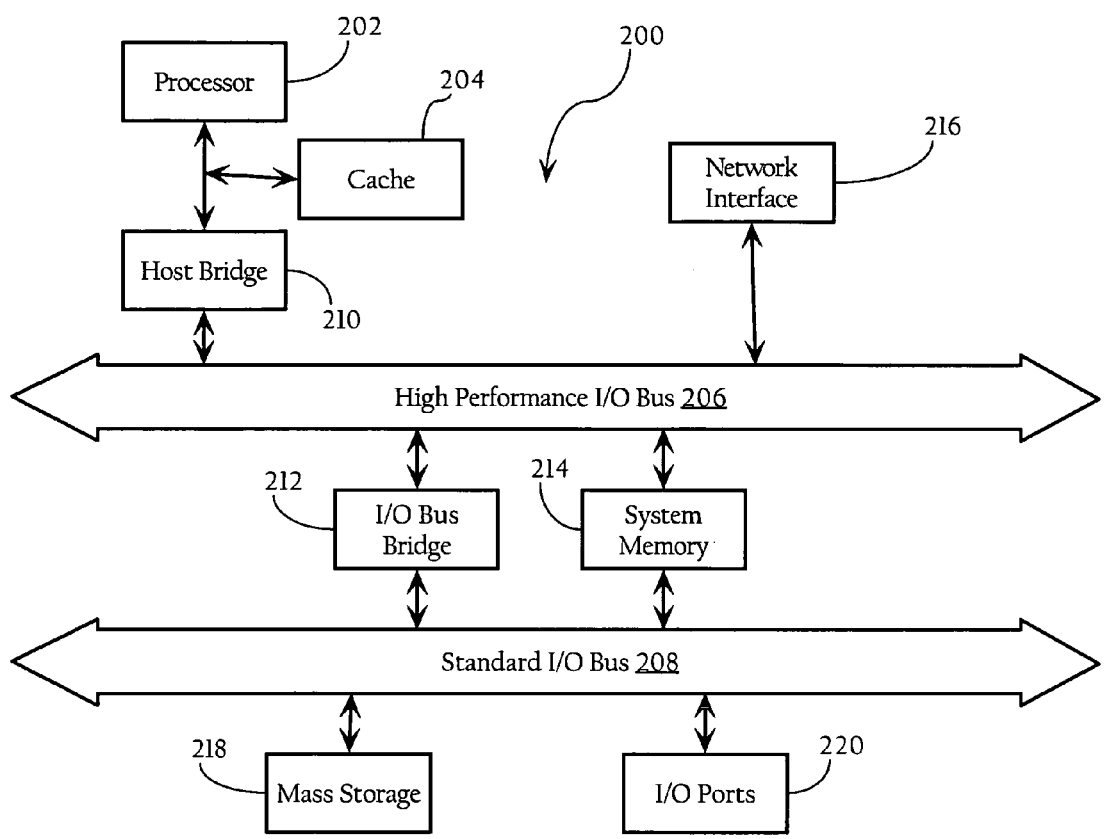
FIG. 3 illustrates for didactic purposes a hardware system, which may be used to implement a location server according to an implementation of the invention.

FIG. 3 illustrates for didactic purposes a hardware system 200, which may be used to implement location server 20 of FIG. 1, or location servers 80, 82a, and 82b of FIG. 2. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200, according to one possible implementation, are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures, and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist with the components of hardware system 200 being coupled to the single bus. Furthermore, hardware system 200 may include additional components, such as additional processors, storage devices, or memories.

As discussed above, in one embodiment, the operations of location server 20 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, and the like.

C. Data Collection

As described above, in one implementation, location server 20 collects data corresponding to various mobile nodes of the WLAN infrastructure. Certain mobile nodes types and the network data associated with such mobile nodes are described below.

Figure 4:
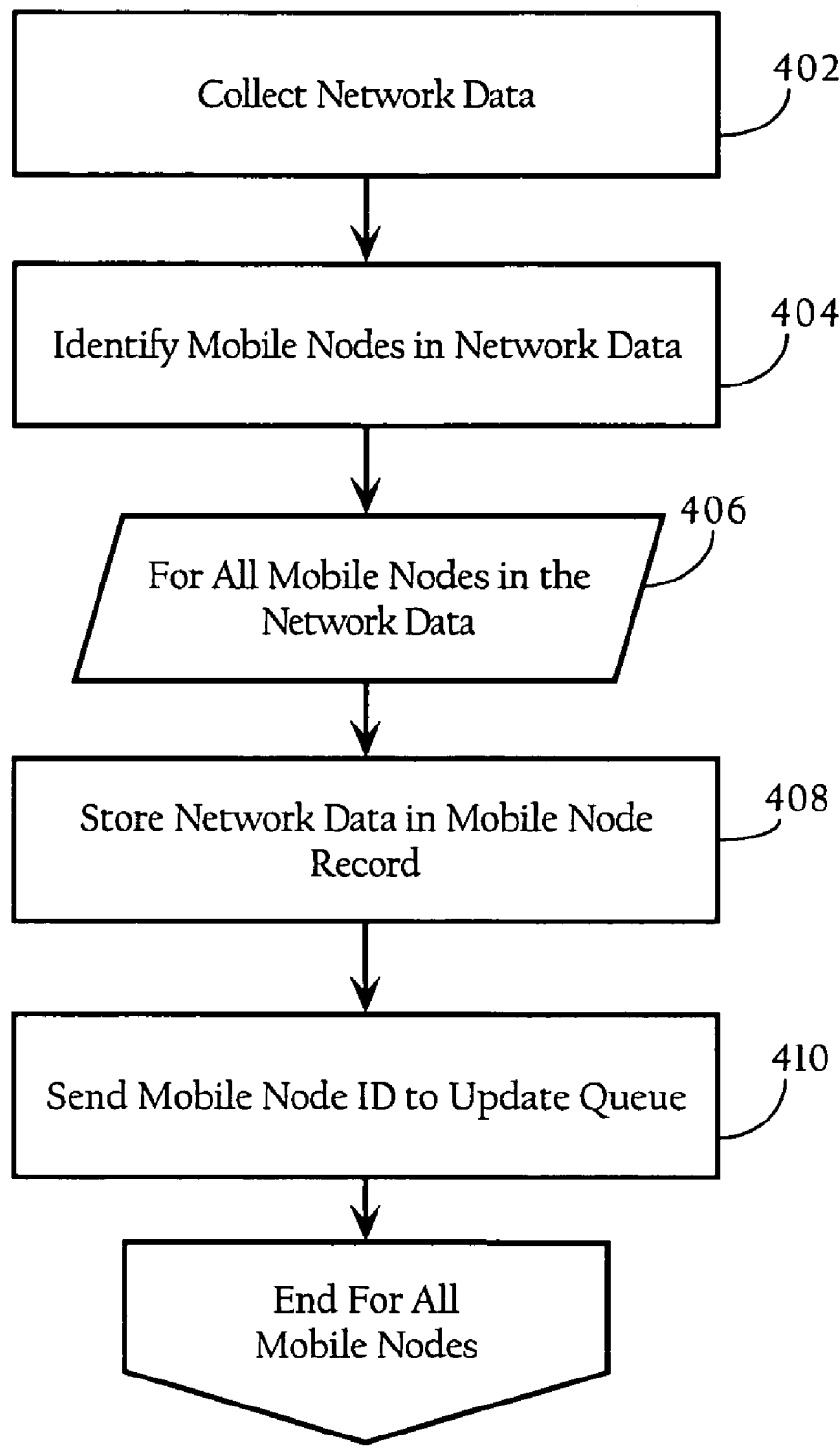
FIG. 4 is a flow chart illustrating a process flow, according to one implementation of the present invention, associated with data collection.

FIG. 4 is a flow chart illustrating a process flow, according to one implementation of the present invention, associated with data collection. As FIG. 4 illustrates, location server 20 collects network data (402) associated with various mobile nodes connected to, and/or detected by, one or more elements of the WLAN infrastructure. In one implementation, location server 20 may collect network data in a pull mode by transmitting queries to the elements of the WLAN infrastructure on a periodic and/or event-driven basis. In addition to, or in lieu of the pull mode, location server 20 may operate in a push mode receiving network data messages initiated by the WLAN elements on a periodic and/or event-driven basis. Location server 20 then identifies one or more mobile nodes in the network data based at least in part on determining the unique MAC addresses (or other mobile node identifiers) in the network data (404). In one implementation, mobile nodes may fall into one of a plurality of mobile node types including, for example, wireless mobile stations (e.g., notebook and laptop computers), radio frequency identification (RFID) tags, and rogue wireless access points and rogue wireless clients. Rogue wireless clients are wireless clients that are associated with rogue wireless access points.

In one implementation, the wireless access points 50 provide received signal strength information or other location measurement information (e.g., Time of Arrival (TOA) or Time Difference of Arrival (TDOA) information) associated with wireless frames transmitted by the mobile nodes. In one implementation, wireless access points 50 make use of the signal strength detection functionality residing on a wireless network interface adapter. For example, the IEEE 802.11 standard defines a mechanism by which RF energy is measured by the circuitry (e.g., chip set) on a wireless network adapter or interface card. The IEEE 802.11 protocol specifies an optional parameter, the received signal strength value (e.g., received signal strength indicator (RSSI), TOA, TDOA, etc.). This parameter is a measure by the PHY layer of the energy observed at the antenna used to receive the current packet or frame. Received signal strength values are measured between the beginning of the start frame delimiter (SFD) and the end of the Physical Layer Convergence Procedure (PLCP) header error check (HEC). This numeric value is an integer with an allowable range of 0-255 (a 1-byte value). Typically, 802.11 chip set vendors have chosen not to actually measure 256 different signal levels. Accordingly, each vendor's 802.11-compliant adapter has a specific maximum received signal strength value (e.g., "RSSI_Max"). Therefore, the RF energy level reported by a particular vendor's wireless network adapter will range between 0 and RSSI_Max. Resolving a given received signal strength value reported by a given vendor's chip set to an actual power value (in dBm) can be accomplished by reference to a conversion table. In addition, some wireless networking chip sets actually report a received signal strength value in dBm units, rather than, or in addition to, RSSI. As discussed in U.S. application Ser. No. 10/407,584, the wireless access points 50 may be configured to tunnel received wireless frames to wireless controller 43 and include received signal strength data in encapsulating headers processed by the wireless controller 43. In another implementation, wireless access points 50 (or wireless controller 43) stores signal strength data corresponding to the last received frame associated with a given mobile node in an extended association table. In one such implementation, the association table is further extended to include a time stamp indicating the time of the last received frame. Accordingly, the signal strength values and time stamps will be overwritten as new frames are received. In other implementations, this information can be stored in a separate table or other data structure. In another implementation, the association table to support dual-band configuration can further be extended to include an identifier for the band (e.g., 2.4 v. 5 GHz band) on which the frame was received. In addition, as described below, the signal strength information may be collected by location server 20 to compute location information as disclosed in the commonly-owned and pending patent applications identified above.

In one implementation, the network data may include traffic metrics (e.g., transmitted bytes, received bytes, number of new flows or streams, number of concurrent flows or streams, retransmitted bytes, etc.), connection state or attribute information corresponding to the mobile nodes (e.g., IEEE 802.11 security parameters, user names, etc.), mobile node ID, received signal strength values, wireless access point visibility, roam events, etc. In one implementation, mobile station information may include, for example, a MAC address, an IP address, a user name, and/or security credentials, WLAN statistics, bytes sent/received, errors, received signal strength data, RF measurement data, etc. In one implementation, information associated with RFID tags (or similar mobile node types) may include, for example, MAC address, battery life, telemetry information (e.g., temperature, motion), WLAN statistics (e.g., number of transmits), received signal strength data, and RF measurement data, etc. In one implementation, detailed rogue wireless access points and rogue wireless clients may include, for example, MAC address, number of access attempts, when rogue wireless access points and rogue wireless clients were last seen, received signal strength data, etc.

For all mobile nodes represented in the network data (406), location server 20 stores the network data in a mobile node record for each mobile node (408). In one implementation, location server 20 creates mobile node records for newly identified mobile nodes, and updates existing mobile node records as needed. In one implementation, each mobile record may be stored in a table arranged by mobile node type in a database. In one implementation, MAC addresses provide the key or index to the tables. In one implementation, location server overwrites previous network data stored in a mobile node record with the new data collected during the last interval. In one implementation, location server 20 also places mobile node IDs corresponding to mobile nodes identified in the network data on an update queue (410). In one implementation, a separate garbage-collection process can scan the database to purge mobile node records that have not been updated within a threshold period of time (e.g., after 30 minutes). As discussed below, in one implementation, a separate process may operate on the updated mobile node records identified in the update queue to perform one or more operations, such as computing the locations of one or more mobile nodes.

D. Data Analysis

In one implementation, the location server 20 may process some of the collected network data to compute information associated with the mobile nodes described above. Such information may include, for example, the location of mobile nodes, historical location data, statistical data, etc. As described above, the network data may be stored in one or more tables arranged by mobile node type in a database. One or more separate analysis processes may then operate on the updated mobile node data corresponding to the mobile nodes identified in the update queue. In one implementation, location server 20 may utilize multiple queues for each mobile node type. In one implementation, a process scheduler may arbitrate among the queues and prioritize processing of the mobile node data (e.g., by mobile node type, by user, etc.). Other priority schemes may be implemented according to priority policy rules.

D.1. Mobile Node Location

Figure 5:
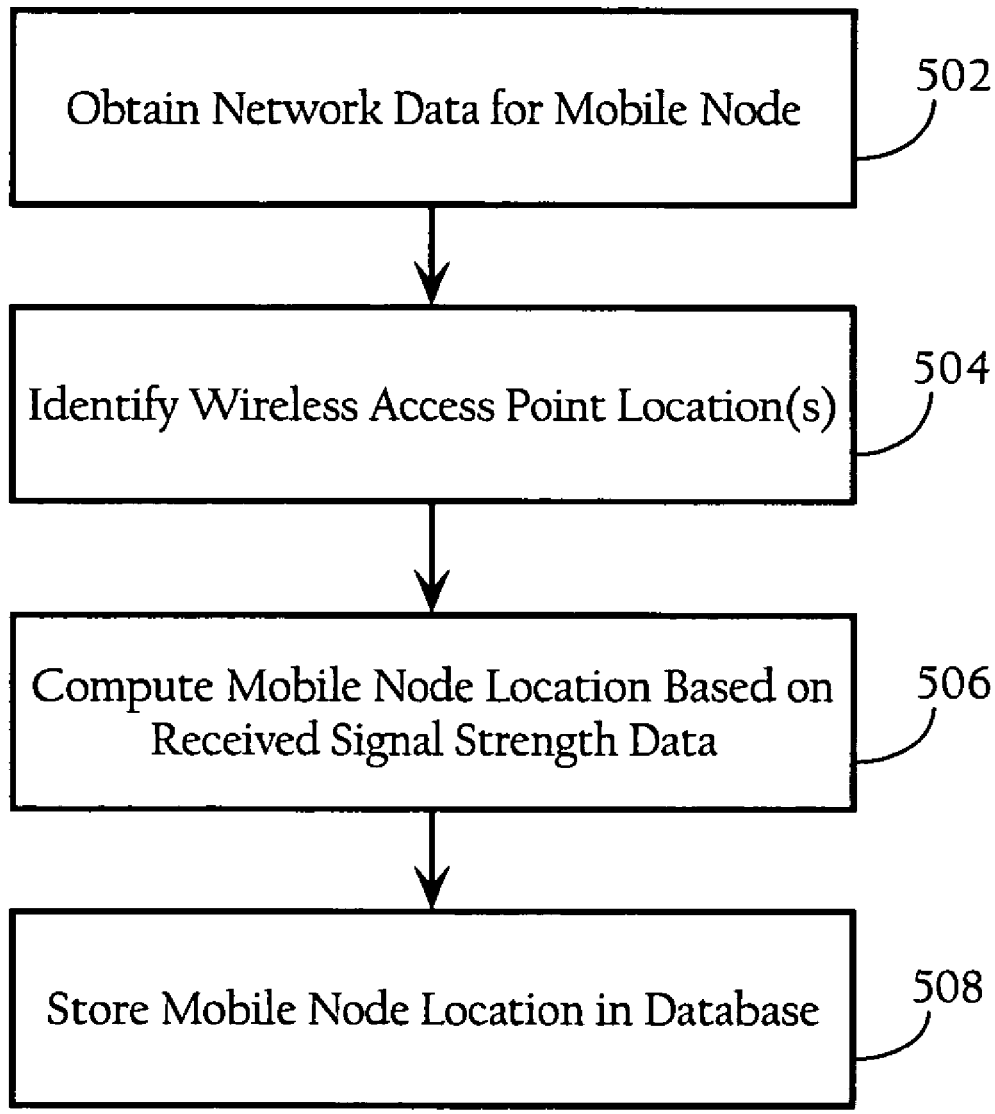
FIG. 5 is a flow chart illustrating a process flow, according to one implementation of the present invention, associated with computing location data.

FIG. 5 is a flow chart illustrating a process flow, according to one implementation of the present invention, associated with computing the location of a mobile node. Location server 20 obtains network data (e.g., received signal strength data) for a given mobile node stored in a corresponding mobile node record (502). Location server 20 identifies wireless access point location(s) (504) corresponding to the wireless access points 50 that detected one or more frames transmitted by the mobile node. Location server 20 computes mobile node location based on the received signal strength data and the location(s) of the wireless access points (506)

and stores the mobile node location in a location database (508). Certain of the U.S. patent applications identified above and incorporated by reference herein disclose how the location of a mobile node can be determined based on received signal strength values. In one implementation, the mobile node location may be stored in association with a time stamp. In one implementation, the computed mobile node location can be stored in the mobile node record.

D.2. Archiving Mobile Node Data

In one implementation, the location server may track the history of a given mobile node. For example, location server 20 may track where a given mobile node has traveled.

FIG. 6 is a flow chart illustrating a process flow, according to one implementation of the present invention, associated with archiving location data to allow for tracking of mobile node location. As FIG. 6 illustrates, an archiving or location tracking process is initiated on a periodic basis (e.g., every 2 minutes, etc.). Location server 20 then applies a history tracking policy to identify mobile nodes to track 604. For example, in one implementation, location server 20 may track mobile nodes based on particular mobile user types, particular classes of users, particular users, etc.). In another implementation, the archiving policy may archive mobile node data only for those mobile node identifiers added to a table or other data structure. For example, a network administrator may manually add one or more mobile node identifiers to an archiving table. A monitoring process may add a mobile node identifier to an archiving process if one or more network data attributes trigger an event. In one implementation, location server 20 then stores the current values in the mobile node records corresponding to the identified mobile nodes in a persistent data store (606). By archiving the data in this manner, the database can return the node history (e.g., location history, node statistics, etc.) corresponding to a mobile node in response to a database query. In addition, other historical network data can be examined and correlated to the computed mobile node location.

D.3. Event-Based Policy Module

FIG. 7 is a flow chart illustrating a process flow, according to one implementation of the present invention, directed to a rules-based engine that applies one or more policies based on one or more values in the mobile node records. In one implementation, a policy engine implemented by location server 20 may apply tracking rules (702) to track various types of network data, and apply one or more actions in response. For example, the tracking rules may be defined relative to one or more attribute types, such as MAC addresses, IP addresses, time of day, location, mobile node type, and the like. For example, one tracking rule can define a threshold region where an action is executed when the computed location of a given mobile node falls within the threshold region. In one implementation, an event may trigger an event policy (704) and the location server 20 executes an action (706) based on the event policy. For example, if a particular rogue wireless client or mobile node of a particular class enters a particular location, a email or other notification may be transmitted to an appropriate system or authority. Another policy action may cause the mobile node identifier to be added to the archive table to maintain node history while the mobile node is in that threshold region.

E. Correlation of Processed Information to Location

In one implementation, the location server may correlate processed information (e.g., location data and/or history data) as described above to particular locations in the wireless environment. For example, location server 20 may correlate mobile node information, such as traffic metrics or statistics, to one or more locations to a provide user movement trends and usage patterns.

E.1. Load Computations

In one implementation, the location server 20, or a separate application residing on another device, may compute the load in a particular location. The load may be, for example, the amount of traffic generated (i.e., frames transmitted/received) in a certain time frame. The load may be used to determine statistics and/or traffic patterns in the location. Such computations may be based on types of mobile nodes (e.g., wireless clients) and/or based on time periods (e.g., 12 pm-1 pm).

FIG. 8 is a flow chart illustrating a process flow, according to one implementation of the present invention, associated with computing load within a given region. Location server 20 determines an analysis area (802), which may be predefined or based on the number of users in a given area or based on the number of observed transmission errors in a given area. The analysis area need not be limited to a region covered by a single wireless access point. For example, in one implementation, the analysis area may be a certain predefined area including locations covered by multiple wireless access points. Location server 20 then identifies the mobile nodes within the analysis area (804), and computes the load in the analysis area observed over a define analysis interval (806). Location server 20 may then apply one or more notification rules with respect to the computed load (808), as described in more detail below. In addition, this load computation can be executed on a periodic basis to analyze load as a function of time of day.

E2. Notification Rules

As described in more detail below, notification rules and processed data may facilitate management of a wireless network. For example, the processed information may indicate locations that may require additional resources (e.g., additional wireless access points). In one implementation, the location server 20 may calculate traffic trends based on the collected network data, as discussed above. In one implementation, the location server may define tracking definitions that execute asynchronous functions upon particular events.

Due to the comprehensive data that location server 20 has available (both network data collected, as well as metrics and data derived from the collected network data), location server 20 can generate useful information and execute management functions based on the information. For example, if location server 20 determines that a mobile node with a specific set of security credentials, is at a particular location, location server 20 may notify a security application that may be configured to photograph the user at the location. In another example, if location server 20 detects a high percentage of packet errors in the network at a given region, location server 20 may generate a list of the top users associated with the errors.

The present invention has been explained with reference to specific embodiments. For example, while embodiments of the present invention have been described as operating in connection with IEEE 802.11 networks, the present invention can be used in connection with any WLAN environment. Other embodiments will be evident to those of ordinary skill in the art. It is therefore not intended that the present invention be limited, except as indicated by the appended claims.

What is claimed is:

1. A wireless location server operative to communicate with one or more elements of a wireless network infrastructure, the wireless location server comprising:
   one or more processors;
   a memory;
   a network interface; and
   a location application, physically stored in the memory, comprising instructions operable to cause the one or more processors to:
      collect network data generated throughout the wireless network infrastructure;

identify one or more mobile nodes from the network data;
store the network data in association with the one or more mobile nodes in a database;
track a present location of each of the one or more mobile nodes by periodically:
identifying a location of a wireless access point with which the mobile node is presently associated;
computing the present location of the mobile node based on a received signal strength value and the location of the wireless access point with which the mobile node is presently associated; and
storing the present location in the database in association with the mobile node;
determine an analysis area;
determine the one or more mobile nodes in the analysis area during a time period; and
compute a load in the analysis area for the time period based on network traffic generated by the one or more mobile nodes in the analysis area during the time period.

2. The wireless location server of claim 1, wherein the location application further comprises instructions operable to cause the one or more processors to archive the network data in association with corresponding mobile nodes.

3. The wireless location server of claim 1, wherein the location application further comprises instructions operable to cause the one or more processors to present one or more application programming interfaces allowing access to the network data stored in the database.

4. The wireless location server of claim 1, wherein, to store network data, the location application further comprises instructions operable to cause the one or more processors to store the network data arranged the mobile node type in a database.

5. The wireless location server of claim 1, wherein the one or more mobile nodes is of a class type comprising one of wireless mobile stations, radio frequency identification (RFID) tags, rogue wireless access points and rogue wireless clients.

6. The wireless location server of claim 1, wherein the network data comprises one or more of security parameters, user names, mobile node identification (ID), media access control (MAC) addresses, statistical information about data transmitted and received by each mobile node in the wide local area network (WLAN), errors, received signal strength data, and radio frequency (RF) measurement data.

7. The wireless location server of claim 1, wherein, to collect network data, the location application further comprises instructions operable to cause the one or more processors to:
store the network data in one or more mobile node records; and
transmit mobile node identifications (IDs) associated with the one or more mobile nodes to a queue.

8. The wireless location server of claim 1, wherein the wireless network driver application further comprises instructions operable to cause the one or more processors to:
apply a tracking rule to the network data;
determine if an event policy has been triggered; and
execute a function based on the event policy.

9. The wireless location server of claim 1, wherein the wireless network driver application further comprises instructions operable to cause the one or more processors to apply one or more notifications with respect to the load.

10. The wireless location server of claim 1, wherein wireless network driver application further comprises instructions operable to cause the one or more processors to correlate at least one of the location data and history data to one or more locations.

11. The wireless location server of claim 1, wherein the wireless network infrastructure is a hierarchical wide area local area network (WLAN).

12. The wireless location server of claim 1, wherein the wireless network infrastructure comprises a master location server and one or more slave location servers.

13. In a wireless location server operative to communicate with one or more elements of a wireless network infrastructure, a method comprising:
collecting network data generated throughout the wireless network infrastructure;
identifying one or more mobile nodes from the network data;
storing the network data in association with the one or more mobile nodes in a database;
tracking a present location of each of the one or more mobile nodes by periodically:
identifying a location of a wireless access point with which the mobile node is presently associated;
computing the present location of the mobile node based on a received signal strength value and the location of the wireless access point with which the mobile node is presently associated; and
storing the present location in the database in association with the mobile node;
determining an analysis area;
determining the one or more mobile nodes in the analysis area during a time period; and
computing a load in the analysis area for the time period based on network traffic generated by the one or more mobile nodes in the analysis area during the time period.

14. The method of claim 13 further comprising archiving the network data in association with corresponding mobile nodes.

15. The method of claim 13 further comprising presenting one or more application programming interfaces allowing access to the network data stored in the database.

16. The method of claim 13 wherein the network data storing comprises storing the network data arranged the mobile node type in a database.

17. The method of claim 13 wherein the one or more mobile nodes is of a class type comprising one of wireless mobile stations, radio frequency identification (RFID) tags, rogue wireless access points and rogue wireless clients.

18. The method of claim 13 wherein the network data comprises one or more of security parameters, user names, mobile node identification (ID), media access control (MAC) addresses, statistical information about data transmitted and received by each mobile node in the wide local area network (WLAN), errors, received signal strength data, and radio frequency (RF) measurement data.

19. The method of claim 13 wherein the network data collecting comprises:
storing the network data in one or more mobile node records; and
transmitting mobile node identifications (IDs) associated with the one or more mobile nodes to a queue.

20. The method of claim 13 further comprising:
applying a tracking rule to the network data;
determining if an event policy has been triggered; and
executing a function based on the event policy.

21. The method server of claim 13, further comprising applying one or more notifications with respect to the load.

22. The method of claim 13 further comprising correlate at least one of the location data and history data to one or more locations.

23. The method of claim 13, wherein the wireless network infrastructure is a hierarchical wide area local area network (WLAN).

24. The method of claim 13, wherein the wireless network infrastructure comprises a master location server and one or more slave location servers.

25. A wireless location server operative to communicate with one or more elements of a wireless network infrastructure, the wireless location server comprising:
- means for collecting network data generated throughout the wireless network infrastructure;
- means for identifying one or more mobile nodes from the network data;
- means for storing the network data in association with the one or more mobile nodes in a database;
- means for tracking a present location of each of the one or more mobile nodes by periodical:
  - means for identifying a location of a wireless access point with which the mobile node is presently associated;
  - means for computing the present location of the mobile node based on a received signal strength value and the location of the wireless access point with which the mobile node is presently associated; and
  - means for storing the present location in the database in association with the mobile node;
- means for determining an analysis area;
- means for determining the one or more mobile nodes in the analysis area during a time period; and
- means for computing a load in the analysis area for the time period based on network traffic generated by the one or more mobile nodes in the analysis area during the time period.

26. A wireless location server comprised in a wireless network, wherein the wireless location server comprises:
- at least one processor;
- a memory;
- at least one network interface; and
- at least one software application stored in the memory, wherein selected ones of the at least one software application comprise computer instructions operable to cause the at least one process to:
  - collect network data generated throughout the wireless network;
  - identify at least one mobile nodes comprised in the wireless network based on the network data;
  - for each of the at least one mobile node, compute a present location of the mobile node and store the present location of the mobile node in a database;
  - for each of the at least one mobile node, track historical locations for the mobile node and store the historical locations of the mobile node in the database;
  - periodically update the locations of the at least one mobile node stored in the database; and
  - compute a load for an analysis area within the wireless network for a time period based on network traffic generated by selected ones of the at least one mobile nodes located in the analysis area during the time period.

27. The wireless location server as recited in claim 26, wherein computing a present location of a mobile node comprises:
- identify a location of a wireless access point with which the mobile node is associated; and
- compute the present location of the mobile node based on the location of the wireless access point with which the mobile node is associated and a signal strength from the mobile node received by the wireless access point.

28. The wireless location server as recited in claim 26, wherein computing a load for an analysis area comprises:
- identify the selected ones of the at least one mobile nodes located in the analysis area;
- monitor the network traffic generated by the selected ones of the at least one mobile nodes located in the analysis area; and
- compute the load for the analysis area based on the network traffic by the selected ones of the at least one mobile nodes located in the analysis area.

29. The wireless location server as recited in claim 26, wherein selected ones of the at least one software application further comprise computer instructions operable to cause the at least one process to notify a party when selected ones of the at least one mobile node are located within a monitored area based on a set of notification rules.

30. The wireless location server as recited in claim 26, wherein selected ones of the at least one software application further comprise computer instructions operable to cause the at least one process to calculate network traffic trends for the wireless network based on the network data.

* * * * *